United States Patent [19]

Edwards et al.

[11] 4,060,203

[45] Nov. 29, 1977

[54] PROTEIN ISOLATION

[75] Inventors: Ronald Alexander Nixon Edwards, Caringbah; Jorge Manrique, Newcastle, both of Australia

[73] Assignee: Unisearch Limited, Kensington, Australia

[21] Appl. No.: 764,509

[22] Filed: Feb. 1, 1977

[30] Foreign Application Priority Data

Feb. 3, 1976   Australia .............................. 4714/76

[51] Int. Cl.$^2$ ............................................ B02C 23/36
[52] U.S. Cl. ........................................... 241/7; 241/12
[58] Field of Search ............................ 241/6, 7, 8, 12; 426/459, 460, 506, 507

[56] References Cited

U.S. PATENT DOCUMENTS

| | | | |
|---|---|---|---|
| 3,782,968 | 1/1974 | Herzberg et al. ...................... | 241/12 |
| 3,979,375 | 9/1976 | Rao et al. ................................. | 241/8 |

*Primary Examiner*—Granville Y. Custer, Jr.
*Attorney, Agent, or Firm*—Millen & White

[57] ABSTRACT

In a process for extracting protein from lupins and other low fat seeds the improvement comprising saturating the seeds with water and wet milling them prior to extracting the protein thereby avoiding undue denaturation of the protein.

8 Claims, 1 Drawing Figure

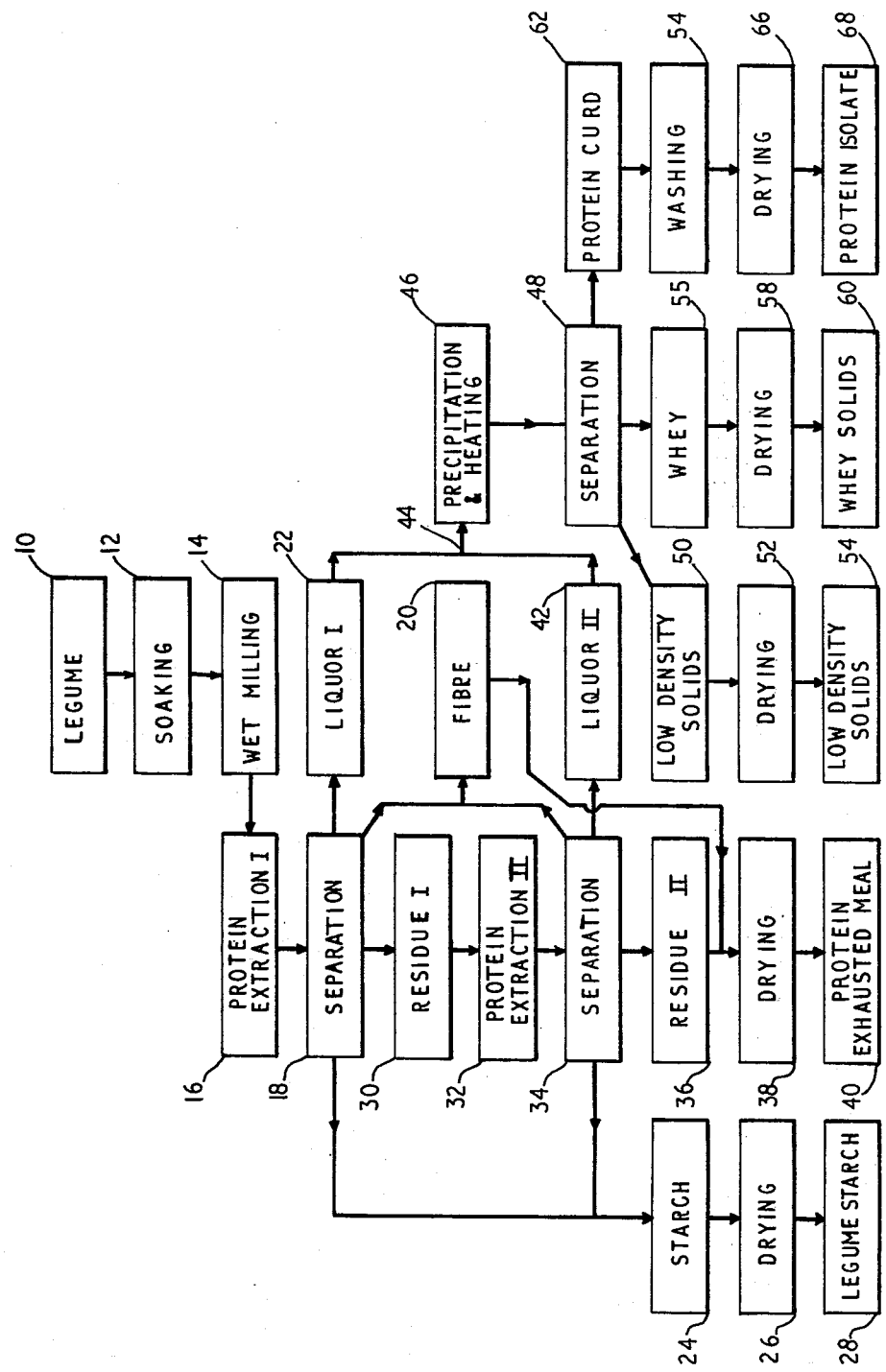

PROTEIN ISOLATION

The present invention relates to an improved process for the extraction of protein from low fat seeds, particularly low fat legume seeds.

It is known to extract protein from protein containing seeds such as Soybean and cottonseed which contain relatively large quantities of oil in addition to the protein. It is also known that protein can also be obtained from low fat seeds i.e. seeds containing 10% by weight or less of an oil. In each of these cases the extraction of the protein has been achieved by the dry milling of the seeds to produce a flour which is then treated to dissolve out the protein which is reprecipitated in a purified form. In the case of low fat seeds this has lead to a considerable denaturation of the protein with a concomitant loss of desirable properties from the protein.

The present invention provides a process for the extraction of protein from protein-bearing seed which involves a complete wet manufacturing procedure of whole or decoated seed avoiding the common dry milling step. The high temperatures and shear stresses developed during a normal seed milling in dry conditions cause great damage to the native condition of the protein, bringing consequently a protein denaturation. When a wet milling process is introduced to a soaked seed the high temperatures and friction forces are drastically reduced so that the protein is preserved to a great extent in native condition. In this way the protein functionality in a food system is highly improved in terms of water binding capacity (WBC), a gel formation (GF), dough formation (DF), and nitrogen dispersibility index (NDI).

According to the present invention in a process for the extraction of protein from low fat seeds, the improvement comprising soaking the seeds in an aqueous medium until the seeds are saturated with water and wet milling the seeds prior to extracting the protein from the seeds.

In the first stage of the process of the invention, the whole seed or decoated seed are water soaked at low temperature. By this process that water permeates the whole or decoated seed until a seed water saturation stage is reached. Water-sorption isotherms will determine the soaking time but overnight soaking at room temperature or 50° C for 2 hours can be taken as extreme soaking conditions. A wet milling step is carried out on the wet material producing a slurry which is subjected to the protein extraction. Preferred protein-bearing seeds for this invention are those whose protein solubility profiles are such that there are solubility maxima at pH 8 – pH 10 or pH 1.5 – pH 2.5 (with a minimum of 50% protein dispersion) and an isoelectrically precipitating region (minimum protein solubility ≦20%) at pH 4.00 – pH 5.25.

If decoated seeds are to be used in the process it is important that they be decoated at a temperature below 60° C to avoid protein denaturation during the decoating. It is common for seeds to be broken up during the decoating process; only seed particles having a volume at least equal to ⅓ of the volume of whole seed should be wet milled. The crushing of the seeds into finer particles can have the effect of partially denaturing the proteins in the seeds.

After the protein is made soluble four fractions can be obtained through a suitable separation step; a floating layer mainly composed of fibre and seed skin components (only when a whole seed is used), the soluble protein, the residue and a starch fraction which passes through a screen (70–100 mesh BS) and is collected on a >250 mesh BS screen. Two or more successive protein extractions can be carried out, handling water:seed ratios of up to 50.1. By introducing fresh water in each new extraction step a seed protein-water gradient is created which will ensure higher protein recoveries. The soluble protein from different extraction steps and from one or more seed origins may be combined and then the protein precipitation is carried out followed by a rapid heating of the solution 60° – 100° C. This heat treatment is necessary to settle the protein curd into a layer of particles and release the oil and low molecular protein components which will float. These are low density solids of very good emulsifying capacity. By efficient separation the low density solids, protein curd and whey solutions may be separated. The heating stage precipitates the protein curd very rapidly and also may destroy heat labile toxic legume components such as trypsin inhibitors, urease, lipoxidase etc.

The protein curd after further purification will form the protein isolate which will possess very good functional properties due to the small protein denaturation during the wet milling step. These functional properties include water binding capacity (WBC), gel formation (GF), thickening, dough formation (DF) and nitrogen dispersibility indix (NDI). For example in dough formation the dough water absorption will be increased around 10% when a 10% protein fortification of wheat flour is carried out. An isolate obtained by an alkaline extraction will produce weaker doughs with more dough extensibility while an isolate obtained by an acid extraction will form shorter doughs. Isolates from acid extraction will have slightly higher protein molecular sizes than those obtained by an alkaline extraction procedure but basically the initial wet milling step will substantially preserve the original protein.

The separation of fibre through flotation will produce protein isolates with acceptable fibre contents. Mineral content in isolates will be increased with higher levels of calcium, iron, sodium, potassium, and phosphorus which will contribute to a longer shelf life. The fat content will vary from 0–15% and this is an advantage as fat is necessary in almost every food formulation, where a protein isolate would be included.

Hereinafter given by way of example only is a preferred embodiment of the invention which is described with reference to the accompanying flow sheet.

Whole or decoated protein bearing seed of low fat content (e.g. lupin, broad beans, chick peas, cow peas, English peas, fibre beans, field beans, kidney beans, lentils, lima beans and ming beans) are the preferred starting legume materials 10. During the soaking step 12 one or more legumes can be used in water-seed ratios between 2:1 to 50:1 and in time-temperature conditions which will vary from overnight at room temperature to 2 hr at 50° C. The wet milling step 14 involves milling the wet material to produce a fine slurry which will pass through a 20–30 mesh sieve (BS). The protein extraction is carried out in multiple steps, in this case in two steps 16 & 32 and generally will involve a water-seed ratio of up to 50:1. The alkaline extracting pH is pH 7 to pH 11 (ideally pH 8 – pH 9) while the acid one is between pH 1.5 to pH 3.0 (preferably pH 2.0 – pH 2.5). The pH changes are effected by the addition of acid or alkali solution (e.g. HCl, NaOH). The protein extraction is carried out for ¼ to 3 hours, (preferably 1 hr.) at room temperature or at the temperature of the slurry with continuous agitation until there is no major pH fluctuation. Different pH extracting combinations can be used e.g. successive extractions at pH 9 or pH 2 or combinations of them. The separation process takes place after each protein extraction, (18 and 34) and may be done by centrifugation or screening or sedimentation or filtration or any combination of them. As a result fibre 20, liquor or soluble protein 22, 42 residue 30, 36 and starch 24 are separated. Fibre 20 is the floating fraction mainly composed of the legume hulls and together with the residue 36 will form the protein exhausted meal used for stock feed. The fibre fraction will not exist when dehulled seed is the starting material. The starch fraction 24 is that obtained from insoluble carbohydrate material which passes a 100 mesh screen BS and is retained on a 250 mesh screen BS. This legume starch is very fine and after drying may be used in cakes, puree and starch applications. The liquors 22, 42 contain the soluble protein from two extraction steps which may involve protein from one or more seed origins of combined or independent protein extractions. They may be combined 44 previous to the isoelectric precipitation 46. The region for protein precipitation is at pH 4 to pH 5.25. As soon as the isoelectric pH is reached a rapid heating (60° – 90° C ½hr) is carried out by means of a plate heat exchanger or live steam injection until the temperature is achieved. By this step the protein curd is settled increasing the particle size several times (from 20-30 micron increased to 50-100 microns). Simultaneously deleterious components such as trypsin inhibitor, urease, luponidase etc., may be destroyed. A separation step 48 which may involve centrifugation, filtration sedimentation or screening or any combination of them will give origin to three fractions: the low density solids 50, the whey 56 and the protein curd 62. The low density solids 50 are mainly composed of protein of low molecular weight (10 – 30,000 M.W.) and fat which will form a product 54 with excellent emulsifying capacity. The proportion of this product in dry basis may vary between 0.5 – 10%. The whey solution 56 in this case will contain slightly higher TSC than other whey solution obtained from a dry milled flour. By the use of ultrafiltration membranes and a further drying procedure whey solids 60 may be obtained which will have very good emulsifying properties. This will apply when the whey is free of toxic soluble material (e.g. Alkaloids). The protein curd 62 is subjected to washings 64 with a water: curd ratio between 2:1 to 40:1 at the precipitation pH. Then it is dried 66 (e.g. spray dried) to yield the protein isolate 68 which will have an overall composition of protein (60-90%) and fat (0-10%) as moisture free basis. The major advantage of such protein isolate or concentrate will be that the protein has been preserved to a great extent in its native condition and little protein denaturation will have occurred. As a result the protein behaves functionally in a food system in a very remarkable way in terms of water binding capacity, gel formation or thickening, dough formation and nitrogen dispersibility index. This functional behaviour is directly connected to protein molecular size and due to the complete wet procedure during the protein isolation the protein molecular size will be large enough to ensure high response in those functional properties in a food system (e.g. meat product, bread etc.). At the same time a dehulling process may be avoided when a whole seed is used. Another advantage is that expensive dry milling machinery is not needed as equipment. The minerals (Ca, Fe, Na, K etc.) in the protein isolate obtained from a whole seed are at higher levels and act as preserving factors which contribute to a longer shelf life. The possibility of isolating the protein from two or more seed origins is very important nutritionally and economically. Nutritionally because the amino acid profile of single seed sources can be modified and improved by the incorporation of other protein sources with different amino acid patterns which will supplement each other. Economically due to the nature of different protein-bearing seed prices and availabilities are two factors which must be considered.

Protein and weight recovery in the protein isolates will be greater than a normal process due to the use of the wet milling step and the multi-extraction stages. The wet milling step by yielding a more intact protein will permit its more efficient recovery. The multiple-extraction stages with water-meal ratios of up to 50:1 will permit the incorporation of fresh water giving a higher protein-water gradient which will ensure higher protein recoveries than extraction done in a single step.

We claim:

1. In a process for the extraction of protein from low fat seeds, the improvement comprising soaking the seeds in an aqueous medium until the seed are saturated with water and wet milling the seeds prior to extracting the protein from the seeds.

2. A process as claimed in claim 1 in which the seeds have protein solubility profiles in which solubility maxima appear at pH 8 to pH 10 and at pH 1.5 to pH 2.5 and an isoelectrically precipitating region at pH 4.0 to pH 5.25.

3. A process as claimed in claim 1 in which the seeds are selected from the group comprising lupins, broad beans, chick peas, cow peas, English peas, fibre beans, field beans, kidney beans, lentils, lima beans and ming beans.

4. A process as claimed in claim 1 in which the seeds are decoated prior to being soaked.

5. A process as claimed in claim 4 in which the seeds were decoated at a temperature below 60° C and in which only decoated seed particles having a volume at least equal the ⅛ the volume of whole seeds are wet milled.

6. A process as claimed in claim 1 in which a plurality of water saturated low fat content seeds are wet milled simultaneously.

7. A process as claimed in claim 1 in which during the soaking and wet milling steps the seed is present in a seed:water ratio of from 1:2 to 1:50.

8. A process as claimed in claim 1 in which the wet milling is carried on until a fine slurry of ground seed is produced which will substantially all pass through a 20 mesh to 30 mesh British standard screen.

* * * * *